United States Patent [19]

Mercer et al.

[11] 3,739,942
[45] June 19, 1973

[54] DISPENSER HAVING A BIMETAL ACTUATED METERING VALVE ASSEMBLY

[75] Inventors: Robert L. Mercer; Edward C. Simmons, both of Dayton, Ohio

[73] Assignee: General Motors Corporation, Detroit, Mich.

[22] Filed: Jan. 18, 1972

[21] Appl. No.: 218,706

[52] U.S. Cl. .................................. 222/54, 222/453
[51] Int. Cl. ............................................. B67d 5/08
[58] Field of Search ................. 222/54, 453; 251/11

[56] References Cited
UNITED STATES PATENTS

| | | | |
|---|---|---|---|
| 3,517,862 | 6/1970 | Bianco | 222/453 X |
| 3,073,490 | 1/1963 | Dahl et al. | 222/453 |
| 3,229,956 | 1/1966 | White | 251/11 |
| 3,346,231 | 10/1967 | Wall | 251/11 |
| 2,959,341 | 11/1960 | Noakes | 222/453 X |

Primary Examiner—Samuel F. Coleman
Assistant Examiner—Larry Martin
Attorney—Frank J. Soucek and Charles R. Engle

[57] ABSTRACT

In preferred form, a mechanically actuated dispenser assembly suitable for use with a domestic appliance such as a dishwasher discharging a metered quantity of flowable liquid or granular material from a reservoir in response to snap action of a cyclic heated bimetallic actuating spring member. A biasing means, i.e., a C-spring, normally positions a plunger actuated dispensing valve in a closed position. A metering valve is attached to the plunger and is normally biased to an open position connecting the reservoir with a metering chamber. The bimetallic actuating spring is electrically heated as desired creating a vertical force component of the bimetallic spring that eventually slightly exceeds a like force component of the biasing means snap moving the plunger downwardly shifting the dispensing valve open and discharging a metered quantity of material while simultaneously moving the metering valve closed. In the preferred form, a biasing C-spring is used an is moved to a stop position just short of an over-center position, assuring return movement of the dispensing valve closed and the metering valve open upon subsequent cooling of the bimetallic actuating spring.

2 Claims, 7 Drawing Figures

PATENTED JUN 19 1973 3,739,942

3,739,942

DISPENSER HAVING A BIMETAL ACTUATED METERING VALVE ASSEMBLY

This invention relates to a mechanically actuated device for dispensing a metered quantity of flowable material and more particularly to such a device utilizing a heat responsive bimetallic actuating spring snap moving spring biased metering and dispensing valves in unison precisely measuring the quantity of material to be dispersed.

In the dispensing art and in environments where it is necessary to discharge a specific quantity of material it has been common practice to use solenoid actuated valves. The solenoids associated with these valves necessarily include an electrical coil winding and circuitry to selectively energize the winding. These elements add to the complexity and expense of providing a dispensing valve. Accordingly, it is a purpose of this invention to provide a dispenser assembly including mechanically actuated valves dispensing a metered quantity of flowable material at specified times in a prescheduled operating cycle. The valve arrangement of this invention, having particular application to a domestic appliance such as a dishwasher but not necessarily being limited to such application, includes a plunger reciprocating within a reservoir and a metering chamber while actuating metering and dispensing valves open and closed. In this respect, the subject valve arrangement is similar to those actuated by a solenoid. The structure of this invention differs from the solenoid devices in that the plunger is in continual engagement with a bimetallic actuating spring. The plunger has axially spaced metering and dispensing valves mounted thereon, the valves straddling a fixed apertured wall defining upper and lower valve seats. The bimetallic spring and the plunger are connected to means normally biasing them to a dispensing valve closed and a metering valve opened position. An electrical resistance is connected in series circuit with the bimetallic actuating spring and the circuit is energized in response to a call for discharge of the material. This heats the bimetallic spring and causes the same to move in opposition to the biasing means. The thermal force of the bimetallic actuating spring overcomes the effective natural force of the biasing means and snaps the valve supporting plunger rapidly downwardly against a stop member simultaneously opening the dispensing valve while closing the metering valve. Engagement of the plunger with the stop member prevents movement of the biasing means to an overcenter position assuring return of the plunger to its normally biased position when the circuit through the bimetallic spring is de-energized removing its thermal force.

It is therefore a primary object of this invention to provide a mechanically actuated plunger supporting spaced metering and dispensing valves dispensing a measured quantity of material from a chamber formed between the spaced valves, the material being discharged by heating a bimetallic actuating spring.

Another object of this invention is the provision of a mechanically actuated dispensing valve assembly wherein a heatable bimetallic spring coacts with a biasing spring, the force of the latter being overcome and the valve moving in response to heating of the bimetallic spring, the spaced valves cooperating first to form a space measuring a predetermined quantity of material in response to such movement and then moving to discharge the material from said space.

Still another object of this invention is the provision of a mechanically actuated dispenser assembly including means normally biasing a dispensing valve closed and a metering valve open and a selectively heated bimetallic spring initially responding to the application of heat to cancel the effective force of said biasing means and snap moving the dispensing valve open and the metering valve closed, the assembly further including a stop member preventing snap movement of the biasing means over-center.

Yet another object of this invention is the provision of a mechanically actuated dispenser assembly including means normally biasing a dispensing valve closed in a stable rest position and a selectively heated bimetallic spring responding to the application of heat moving initially to overcome the force of said biasing means placing the assembly components in a condition of unstability, the unstability increasing with further movement of the bimetallic spring until said dispensing valve is snapped open.

A further object of this invention is the provision of a bimetallic spring unit achieving the above objects and suitable for being heated under the regulation of a dishwasher control timer.

Further, it is an object of the present invention to provide a dispenser having a bimetal actuated metering valve assembly particularly suitable for dishwasher application having features of construction, combination and arrangement making it simple, readily manufactured, reliable, inexpensive and otherwise commercially useful.

Further objects and advantages of the present invention will be apparent from the following description, reference being had to the accompanying drawings wherein preferred embodiments of the present invention are clearly shown.

In the drawings:

FIG. 2b is a fragmentary plan view showing the shape of the components in FIG. 2a.

Figure 2A:
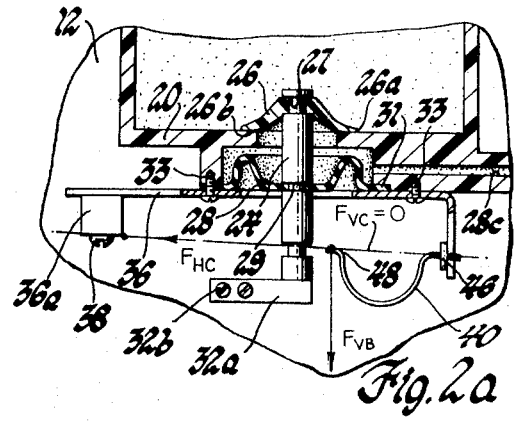
FIG. 2a is a fragmentary view of FIG. 2 with the actuating components in the vertically moved position and with explanatory lines of the associated force diagram.
Figure 2B:
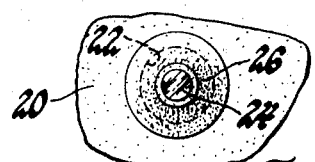
Figure 2:
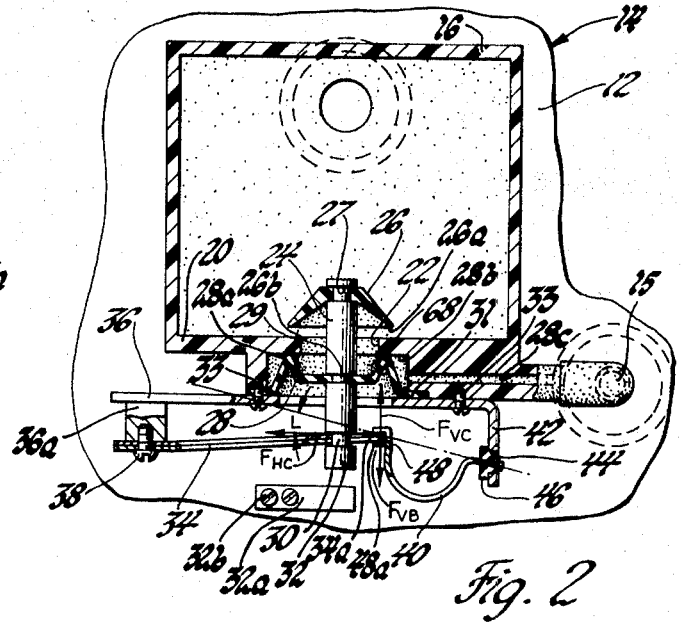
FIG. 2 is a fragmentary enlarged view of the dishwasher through line 2—2 of FIG. 1 with explanatory lines for a static biasing force diagram.
Figure 5:
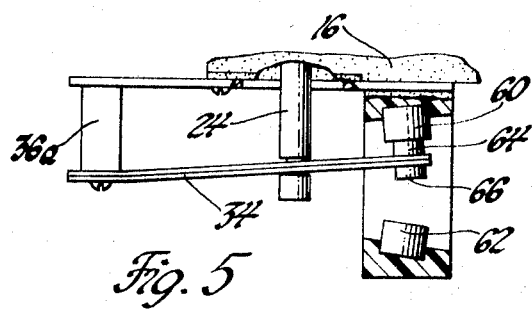

FIG. 5 also is a fragmentary view, partly in section, like FIG. 2 but showing a further modification of the subject invention.

Figure 1:
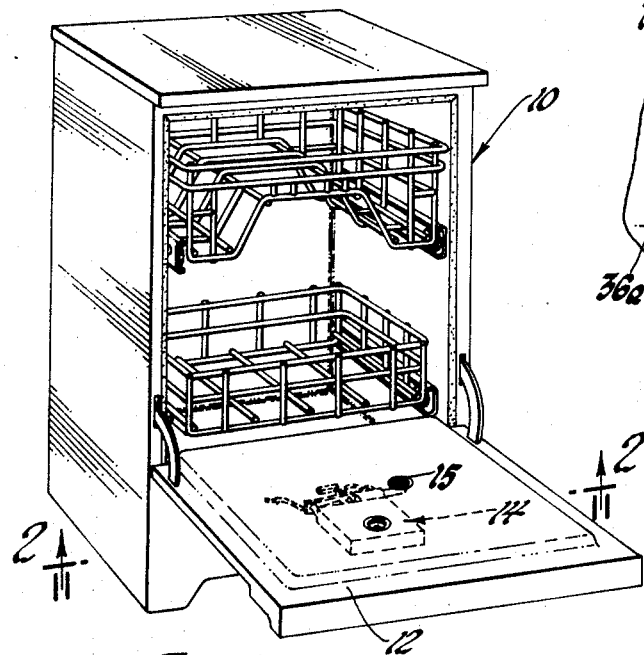
FIG. 1 is a perspective view showing the dispenser assembly of the subject invention, in broken lines, secured to a dishwasher cabinet door.

In FIG. 1, a dishwasher cabinet 10 is shown having a door 12 pivotally mounted thereon for movement between a vertical closed position, not shown, and a horizontal open position. The door 12 contains a dispenser assembly 14 shown in broken lines. The purpose of the dispenser, as hereinafter described is to discharge a predetermined quantity of material, such as water conditioner, through opening 15 into the interior of the dishwasher, where it is effective to condition the water therein.

Figure 3:
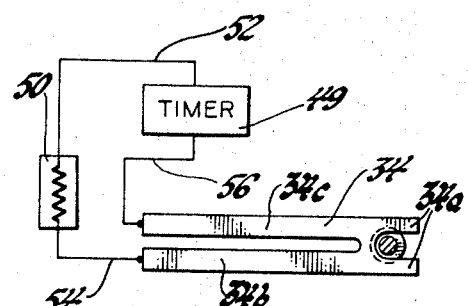
FIG. 3 is a schematic diagram of an electrical control circuit including the bimetallic actuating spring of the subject invention.

As illustrated in FIG. 2, the dispenser assembly 14 includes a container 16, which may be of suitable plastic material, defining a reservoir containing a quantity of flowable granular or liquid water conditioning material. The container 16 includes a wall 20, which is on the bottom of the unit when the door is closed. The wall 20 contains an aperture 22 receiving a valve supporting plunger 24. A first flexible metering valve 26, of rubber or similar material, is secured to the plunger 24 adjacent its upper end in a first annular groove 27. As shown, valve 26 is of inverted cup-like conformation defining an annular face 26a adapted to engage a seat portion 26b of wall 20 and form a seal. A flexible diaphragm dispensing valve 28, likewise of rubber or similar material, is also secured to the plunger 24 but is retained near its mid portion in a second annular groove 29. Valve 28 is so shaped as to form an upstanding annular rim 28a which engages seat portion 28b on the side opposite seat portion 26b of wall 20. The rim 28a engages seat portion 28b to form a space-defining seal as hereinafter described. Periphery 31 of valve 28 is secured to wall 20 by screws 33 retaining a bracket 36, later described. The plunger 24 further has a third reduced annular groove 30 near its lower end 32 receiving a free end 34a of a bifurcated bimetallic actuating spring 34, as shown in FIG. 3. A stop member 32a, in the form of plastic block or other suitable material, is secured to the door 12 by screws 32b adjacent lower end 32 of plunger 24. The stop member limits downward movement of the plunger, as viewed in FIG. 2. The spring 34 is secured to the bracket 36 by means of a screw 38 which is received in a depending boss 36a. A C-spring 40 is also secured to the bracket 36 at a downturned end 42 which diametrically opposed to the boss 36a, as shown. End 42 contains an aperture 44 receiving a spring-retaining resilient bushing 46. A slotted end 48a of C-spring 40 straddles the otherwise free end portions 34a of the bimetallic spring 34 to 48 so that the normal upward biasing force of the spring 40 coacts with the force of bimetallic spring 34, if any, causing the valve supporting plunger 24 to assume the rest position shown in FIG. 2.

In FIG. 3, bimetallic spring 34 is connected in electrical series circuit with a dishwasher cycle timer 49 and a resistor 50, which can be in the form of a resistance heater. The resistor 50 is included to limit the amount of current applied to spring 34 so as to prevent destruction thereof. The timer 49 is connected to resistor 50 by lead 52 and lead 54 connects resistor 50 with bimetallic spring 34. The current flows through legs 34b and 34c of the spring, traversing a distance sufficient to properly heat the spring before the circuit is completed back to the timer 49 through lead 56. The bimetallic spring 34 is, by virtue of this circuit, selectively heated during operation of the dishwasher in accordance with predetermined programming of the timer 49.

Figure 4:
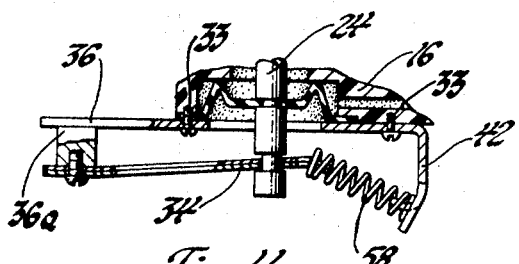
FIG. 4 is a fragmentary view, partly in section, like FIG. 2 showing a modification of the subject invention.

A first modification of the subject invention is disclosed in FIG. 4, wherein a coil compression spring 58 replaces the above-described C-spring 40. The spring 58 applies an upward vertical force normally holding the plunger 24 as shown. In FIG. 5, a second modification is illustrated wherein the spring members are eliminated and permanent magnets 60 and 62 are used in conjuncation with the bimetallic spring 34. IN a normal static at rest position, i.e. a non-heated condition, the bimetallic spring is drawn against the upper magnet 60 engaging its upper contact 64 therewith. Completion of the electrical circuit of FIG. 3 heats the bimetallic spring 34 and its heat generated force eventually overcomes the static biasing force of magnet 60. When the force of spring 34 slightly exceeds the force of magnet 60 it snap moves its lower contact 66 into engagement with lower magnet 62 opening the dispensing valve 28 while closing metering valve 26.

Referring again to FIG. 2, metering valve 26, aperture 22 in wall 20, and dispensing valve 28 cooperate to form a metering chamber 68. The flowable water conditioning material in container 16 flows around valve 26 through aperture 22 and against dispensing valve 28 filling chamber 68 while the metering valve 26 is open. Downward movement of plunger 24 closes metering valve 26 and opens valve 28 so that a measured quantity of material from chamber 68 is dispensed in a manner more specifically disclosed during the following description of the operation of the subject invention.

In operation, the bimetallic spring 34 assumes the position shown in FIG. 2 in its normally cooled state. The mechanical actuating mechanism of the dispenser assembly 14 is in a normally biased stable condition under the influence of C-spring 40. In this condition, the C-spring 40 biases the metallic spring 34 and plunger 24 upwardly maintaining dispensing valve 28 closed while metering valve 26 is open. A predetermined quantity of flowable material in container 16 flows through aperture 22 into the metering chamber 68, wherein it is retained by the dispensing valve 28. The C-spring 40 exerts a constant vertical force $F_{vc}$ upwardly maintaining plunger 24 as illustrated. The magnitude of force $F_{vc}$ is substantially equal to the opening force of spring 40 times the sine of angle L. At this time the bimetallic spring 34 exerts a vertical force $F_{vb}$ in opposition to the vertical force $F_{vc}$ of the C-spring 40, but the latter is of a magnitude sufficient to cause the diaphragm dispensing valve 28 to bear against valve seat 28b. The bimetallic spring 34 and the C-spring 40 can have various relative spring rates, the design limitations primarily being that the C-spring has to be effective to bias the dispensing valve 28 closed in a normal condition and the bimetallic spring 34 must have sufficient force, upon heating, to overcome the force of C-spring 40 and snap the plunger to a dispensing valve open position.

When it is desired to dispense a measured quantity of material from chamber 68, the timer 49 completes the circuit through resistance 50 heating the bimetallic actuating spring 34. At this time the mechanical actuating mechanism of the dispenser assembly is in a normally spring biased stable position. As the actuating spring 34 begins to move against the force of C-spring 40 in response to heat generated by the completed circuit, the vertical force $F_{vc}$ of C-spring 40 remains constant while force $F_{vb}$ of spring 34 increases and the mechanism becomes progressively more unstable. Operation of the mechanical actuating mechanism including the bimetallic spring 34, C-spring 40 and valve plunger 24 is best understood by considering three separate operative positions. In a first at rest position, the valve plunger 24 is normally biased upwardly by the constant force $F_{vc}$ of spring 40 closing dispensing valve 28 and opening metering valve 26. The bimetallic spring 34 is ineffective to move the plunger 24 and the circuit through timer 49 is open. In a second initially unstable dynamic position, the circuit through timer 48 is completed and bimetallic spring 34 is heated so that its force Fvb is infinitesimally larger than Fvc of spring 40 snap moving plunger 24 downwardly engaging valve face 26a with seat 26b isolating the material in container 16 from that to be dispensed in metering chamber 68. As this snap movement begins, force Fvc of C-spring 40 approaches zero by virtue of the point of contact 48 between the springs moving the line of action toward the straight line position shown in FIG. 2a. At this time, while plunger 24 is being snap moved, diaphragm dispensing valve 28 may be partially opened or may be closed at the option of the designer. Of course, the timing of opening and closing must be such as to dispense a desired measured quantity of material through the chamber 68. In a third unstable dynamic position, the force Fvc of C-spring 40 eventually reaches zero as the spring contact points from the line shown in FIG. 2a, and plunger 24 moves rapidly downwardly against stop 32a. Valve face 26b of metering valve 26 is moved by the plunger into flexed engagement with seat 26b providing a positive seal therebetween and valve 28 and its annular rim 28b is moved away from seat 28b providing positive discharge of the material through valve 28, passage 28c and opening 15 into the dishwasher. A major portion of the water conditioning material is discharged while the valve 28 is being moved open. The timer 49 them completes this portion of the cycle and the circuit to the bimetallic spring 34 is opened. The spring 34 then continuously moves through the aforementioned three positions in reverse order and conditions the mechanism for a new cycle of operation, the C-spring 40 being again effective to bias the plunger 24 upwardly away from stop 32 and closing dispensing valve 28.

The modifications in FIGS. 4 and 5 operate in a similar manner in that the vertical force component of coil compression spring 58 is overcome by the heating of the bimetallic spring 34 and likewise snap movement of the plunger 24 occurs when the force of spring 34 slightly exceeds that of spring 40. In FIG. 5, the strength of the permanent magnets 60 and 62 is predetermined so that the initial movement of the bimetallic spring 34 disengages the contact 64 from the magnet 60 and further movement causes the plunger 24 to be snapped downwardly as contact 66 is drawn against magnet 62. Of course, the bimetallic spring 34 has an inherent spring force sufficient to again move contact 64 into engagement with magnet 60 upon de-energization of the heater element 50.

The dispensing valve of the present invention discharges a precise quantity of material as required during the operational cycle of a domestic appliance such as a dishwasher. In the case of a dishwasher, flowable water conditioning materials are expensive making it in the interest of the user that a precise amount be dispensed in each cycle.

It will be apparent to those skilled in the art that various modifications of the subject invention can be accomplished without departing from the scope thereof. The above described embodiments of a mechanical actuating mechanism having application in a material dispenser have been used for purposes of illustration only and are not intended to limit the scope of this invention except as required by the following appended claims.

We claim:

1. A mechanically actuated dispenser discharging a predetermined quantity of flowable material when actuated, comprising a container having a wall defining an interior valve seat and an exterior valve seat adjacent an aperture therethrough so that said material may flow from said container; a plunger; a metering valve attached to said plunger and cooperable with the interior valve seat; a dispensing valve attached to said plunger in spaced relation to said metering valve and cooperable with the exterior valve seat; said plunger being mounted for reciprocating movement upwardly and downwardly in said wall aperture so as to seat the dispensing valve in an upper position preventing flow of material from said container and unseating said valve in a lowered position so as to allow flow; said metering valve being in spaced relation to said interior valve seat in said upper position and seating against the interior valve seat in a lowered position; said apertured wall of said container, said metering valve, and said dispensing valve defining a metering chamber during downward snap movement of the plunger; said plunger having a portion extending exteriorly of said container; a bimetallic spring attached to said exterior portion of said plunger; an electrical control circuit effective to heat said bimetallic spring; said bimetallic spring connected in said control circuit whereby the electrical energy flowing through said spring heats said spring causing it to move against its inherent biasing force when said circuit is closed, and means exerting a constant upward force normally biasing said plunger, said valves and said bimetallic spring upwardly, closing said dispensing valve against said container wall exterior valve seat while holding said metering valve open in a position above and out of engagement with said wall interior valve seat allowing material to flow from said container filling said metering chamber; completion of said control circuit heating said bimetallic spring to initiate downward movement of said plunger whereby an unstable system is defined and the dispensing valve is snapped downwardly open with said plunger while said metering valve is simultaneously closed against said container wall interior valve seat.

2. In a dishwasher including automatic control circuitry of the type wherein a timer regulates the sequence a predetermined operational cycle and the energization of a heater circuit, a mechanically actuated dispenser assembly discharging a precise quantity of flowable water conditioning material comprising; a container defining a reservoir; a bottom wall of said container containing an aperture and defining an interior and an exterior valve seat; a valve plunger mounted for reciprocating movement in said aperture; a first end of said plunger extending within said container and having a first annular groove therein; a flexible metering valve secured in said first annular groove, said valve plunger having a second groove formed near its axial mid-portion; a flexible diaphragm dispensing valve secured In said second groove, the circumferential periphery of said diaphragm dispensing valve being secured to said container bottom wall, said container wall, said metering valve and said dispensing valve defining a metering chamber; a bimetallic mechanical actuating spring attached to said plunger in a third annular groove therein adjacent a second end of said plunger extending out of said container; said actuating spring being connected in said heater circuit so that electrical energy flows through said spring; and a C- spring secured to said container and said bimetallic spring normally biasing the valve plunger upwardly in a stable dynamic position closing said dispensing valve against the exterior valve seat and opening said metering valve; said bimetallic actuating spring responding to closure of said heater circuit at specified time in the operation of said dishwasher and moving against the biasing force of said C-spring when its force slightly exceeds that of said C-spring as heat is generated in said bimetallic spring whereby said bimetallic spring snaps the valve plunger downwardly closing the metering valve against the interior valve seat and opening the dispensing valve discharging a metered quantity of the flowable water conditioning material into the dishwasher.

* * * * *